US011283901B2

(12) United States Patent
Kuo

(10) Patent No.: US 11,283,901 B2
(45) Date of Patent: Mar. 22, 2022

(54) NEURAL NETWORK MODEL BASED CONFIGURATION OF SETTINGS

(71) Applicant: SONY CORPORATION, Tokyo (JP)

(72) Inventor: Jenke Wu Kuo, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 16 days.

(21) Appl. No.: 16/730,124

(22) Filed: Dec. 30, 2019

(65) Prior Publication Data
US 2021/0203753 A1 Jul. 1, 2021

(51) Int. Cl.
*G06F 15/177* (2006.01)
*H04L 67/00* (2022.01)
*G06N 3/08* (2006.01)
*H04L 67/306* (2022.01)
*H04L 67/50* (2022.01)

(52) U.S. Cl.
CPC ............... *H04L 67/34* (2013.01); *G06N 3/08* (2013.01); *H04L 67/22* (2013.01); *H04L 67/306* (2013.01)

(58) Field of Classification Search
CPC ....... H04L 67/22; H04L 67/34; H04L 67/306; G06F 16/338
See application file for complete search history.

(56) References Cited

U.S. PATENT DOCUMENTS

| 6,078,348 A | 6/2000 | Klosterman et al. |
| 9,854,386 B2 | 12/2017 | Karp |
| 10,776,412 B2* | 9/2020 | Roy ...................... G06F 16/338 |
| 10,938,660 B1* | 3/2021 | Kapur ..................... H04L 41/22 |
| 2015/0094093 A1* | 4/2015 | Pierce ................... H04W 4/021 455/456.3 |
| 2016/0360559 A1* | 12/2016 | Chrisikos .............. H04W 8/005 |
| 2019/0171934 A1* | 6/2019 | Sites ........................ G06N 3/08 |

FOREIGN PATENT DOCUMENTS

AU 2011205426 B2 1/2014

* cited by examiner

*Primary Examiner* — Yves Dalencourt
(74) *Attorney, Agent, or Firm* — Chip Law Group

(57) ABSTRACT

A server that includes circuitry and memory is provided. The memory stores a neural network model trained based on first device-usage information and a first set of configuration values for a first plurality of settings, associated with at least one first electronic device. The circuitry receives second capability information of a second electronic device from the second electronic device and compares the second capability information with first capability information of the at least one first electronic device. The circuitry further determines a second set of configuration values for a second plurality of settings of the first plurality of settings based on the comparison of the second capability information with the first capability information. Further, the circuitry transmits the second set of configuration values for the second plurality of settings and the corresponding first device-usage information to the second electronic device for configuration of the second electronic device.

20 Claims, 6 Drawing Sheets

| Time of Usage 304 | First Exemplary Settings 306 | First Exemplary Configuration Values 308 |
|---|---|---|
| 9 AM – 6 PM | Display Setting | 70% Brightness |
| 9 AM – 6 PM | Audio Setting | 50% Volume |
| 9 AM – 6 PM | Power Setting | Normal power mode |
| 6 PM – 9 PM | Display Setting | 50% Brightness |
| 6 PM – 9 PM | Audio Setting | 70% Volume |
| 6 PM – 9 PM | Power Setting | Normal power mode |
| 9 PM – 9 AM | Display Setting | 35% Brightness |
| 9 PM – 9 AM | Audio Setting | 35% Volume |
| 9 PM – 9 AM | Power Setting | Power saving mode |

| Location of Usage 312 | Second Exemplary Settings 314 | Second Exemplary Configuration Values 316 |
|---|---|---|
| Work | Audio Setting | 35% Volume |
| Work | Network Setting | Office WLAN |
| Work | Power Setting | Normal power mode |
| Home | Audio Setting | 75% Volume |
| Home | Network Setting | Home Wi-Fi network |
| Home | Power Setting | Normal power mode |
| Outdoors | Audio Setting | 55% Volume |
| Outdoors | Network Setting | Cellular network |
| Outdoors | Power Setting | Power saving mode |

| User Profile Information 320 | Third Exemplary Settings 322 | Third Exemplary Configuration Values 324 |
|---|---|---|
| Child user | Accessibility Setting | Accessibility mode "OFF" |
| Child user | Closed Caption Setting | Closed Caption "OFF" |
| Child user | Security Setting | Parental Control "ON" |
| Adult user | Accessibility Setting | Accessibility mode "OFF" |
| Adult user | Closed Caption Setting | Closed Caption "ON"; English language |
| Adult user | Security Setting | Parental Control "OFF" |
| Elder user | Accessibility Setting | Accessibility mode "ON" |
| Elder user | Closed Caption Setting | Closed Caption "ON"; Native language |
| Elder user | Security Setting | Parental Control "OFF" |

NEURAL NETWORK MODEL BASED CONFIGURATION OF SETTINGS

CROSS-REFERENCE TO RELATED APPLICATIONS/INCORPORATION BY REFERENCE

None.

FIELD

Various embodiments of the disclosure relate to configuration of settings. More specifically, various embodiments of the disclosure relate to an apparatus and a method for neural network model based configuration of settings.

BACKGROUND

With the advancement of technology, electronic devices with newer capabilities and configuration features are being prominent in the market. To setup or configure a new electronic device, a user may have to understand the capabilities and related technologies implemented in the electronic device. Further, the user may have to traverse through complicated setup menus of the electronic device to configure various settings of the electronic device. In certain situations, a user may not be aware about the setup menus or various capability options in the new electronic device, and may find the desired configuration process cumbersome. Thus, an intelligent system may be required that may provide automatic configuration of new electronic devices based on user preferences.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and a method for neural network model based configuration of settings, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 3A, 3B, and 3C are diagrams that collectively illustrate exemplary usage scenarios of an electronic device based on which a neural network model is trained, in accordance with an embodiment of the disclosure.

DETAILED DESCRIPTION

The following described implementations may be found in the disclosed apparatus and method for automatic configuration of settings of an electronic device based on a neural network model being trained based on, usage, preferences, and/or configuration of another electronic device(s). Exemplary aspects of the disclosure provide a server that may be configured to store a neural network model trained based on first device-usage information (for example a time of usage, a location of usage, or user-profile information of a plurality of users) of at least one first electronic device (e.g., a television (TV) or a sound system) and a first set of configuration values for a first plurality of settings (e.g., a display setting, a power setting, an audio setting, or a user-interface setting) of the at least one first electronic device (for example an old device). The first electronic device may have a first capability (e.g., hardware capability or software capability) that may be associated with the first plurality of settings. The server may be configured to receive, from a second electronic device (for example a new device), second capability information which may indicate a capability (hardware or software) of the second electronic device. The server may further compare the second capability information of the second electronic device with the first capability information of the at least one first electronic device. The server may further determine a second set of configuration values for a second plurality of settings, which may be a set from the first plurality of settings based on the comparison. Further, the server may transmit the determined second set of configuration values for the second plurality of settings and the corresponding first device-usage information to the second electronic device for the automatic configuration of the second electronic device.

A new electronic device (e.g., the second electronic device) may be auto-configured based on the determined second settings, which may be relevant to the capabilities of the new electronic device, and may be based on the neural network model, which may be trained on usage trend of a set of previous electronic devices (e.g., the at least one first electronic device) either associated with same or different users. Such auto-configuration of the settings of the new electronic device may reduce manual effort (i.e. referring UI menu and operational guides) to configure the new electronic device and increase configuration process efficiency. The disclosed server may further receive usage information of the new electronic device (i.e. configured based on the determined settings) and re-train the store neural network model. The re-trained model may further enhance an accuracy of the auto-configuration of other new electronic devices (for example a third electronic device) to be associated with the user of the second electronic device.

Figure 1:
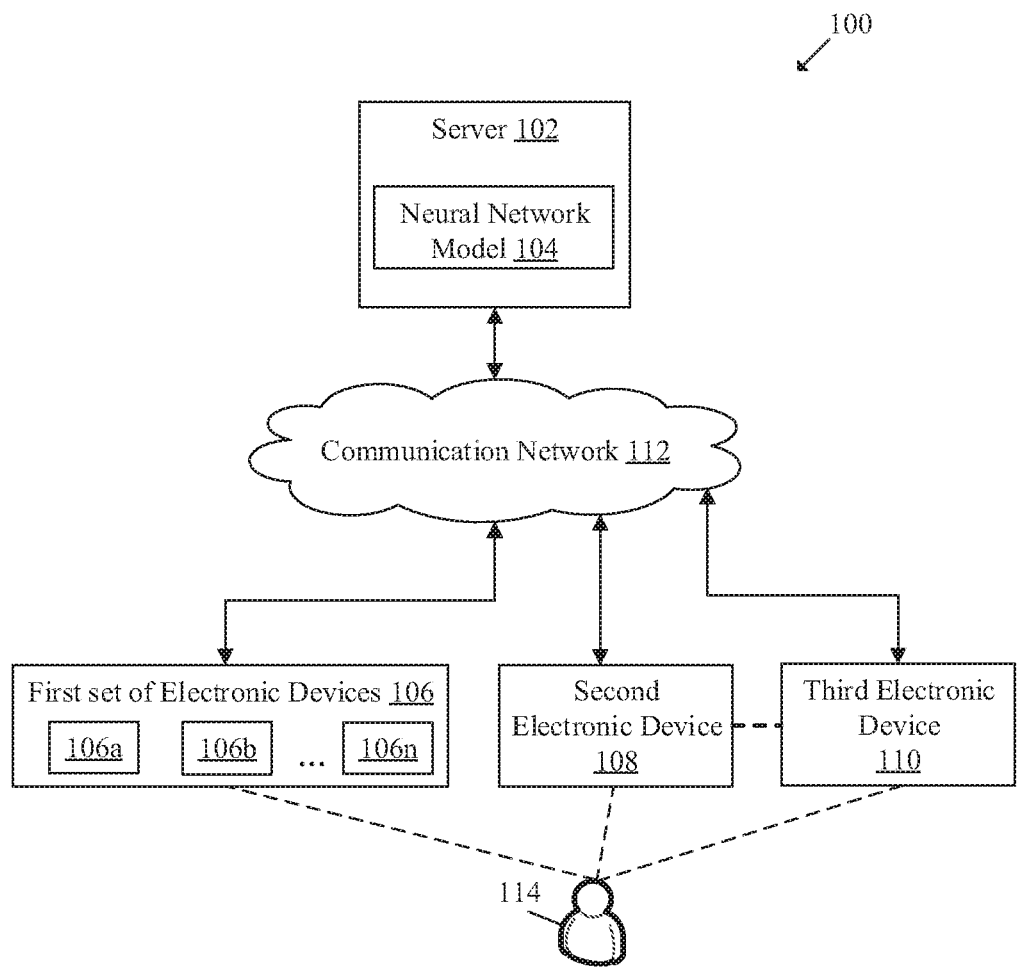
FIG. 1 is a block diagram that illustrates an exemplary network environment for configuration of settings based on a neural network model, in accordance with an embodiment of the disclosure.

FIG. 1 is a block diagram that illustrates an exemplary network environment for configuration of settings based on a neural network model, in accordance with an embodiment of the disclosure. With reference to FIG. 1, there is shown a network environment 100. The network environment 100 may include a server 102, a first set of electronic devices 106, a second electronic device 108, and a third electronic device 110. The first set of electronic devices 106 may include at least one first electronic device, such as, an electronic device 106a, an electronic device 106b . . . , and an electronic device 106n. The server 102 may include a neural network model 104. The server 102 may be coupled to the first set of electronic devices 106, the second electronic device 108, and the third electronic device 110, via a communication network 112. The second electronic device 108 may be coupled to the third electronic device 110 as shown in FIG. 1. In some embodiments, the electronic device 106a, the second electronic device 108, and the third electronic device 110 may be associated with a (for example a user 114). It should be noted that the "n" number of electronic devices in the first set of electronic devices 106 shown in FIG. 1 is presented merely as an example. The first set of electronic devices 106 may include only one electronic device or more than "n" electronic devices, without a deviation from scope of the disclosure.

The server 102 may include suitable logic, circuitry, interfaces, and/or code that may be configured to store the neural network model 104. The server 102 may be configured to train the neural network model 104 based on first device-usage information of the first set of electronic devices 106 and a first set of configuration values for a first plurality of settings of the first set of electronic devices 106. The server 102 may be further configured to store first capability information of the first set of electronic devices 106. The server 102 may further receive second capability information of the second electronic device 108 from the second electronic device 108. The server 102 may be further configured to compare the second capability information of the second electronic device 108 with the first capability information of each of the first set of electronic devices 106. The server 102 may be further configured to determine a second set of configuration values for a second plurality of settings of the first plurality of settings based on the comparison. The second set of configuration values may be determined for configuration of the second electronic device 108 (i.e. a new electronic device). The server 102 may be further configured to transmit the determined second set of configuration values for the second plurality of settings and the corresponding first device-usage information to the second electronic device 108 for configuration of the second electronic device 108. Examples of the server 102 may include, but are not limited to, an application server, a cloud server, a mainframe server, a database server, a file server, a web server, or other types of servers.

In one or more embodiments, the neural network model 104 may include electronic data, such as, for example, a software program, code of the software program, libraries, applications, scripts, or other logic or instructions for execution by a processing device, such as a processor (e.g., a processor 204 of FIG. 2) of the server 102. The neural network model 104 may be trained based on the first device-usage information of the first set of electronic devices 106 and the first set of configuration values for the first plurality of settings of the first set of electronic devices 106. For example, the first device-usage information may include information about time and/or location of usage of the electronic device 106a (e.g., a television). The first plurality of settings may include, but is not limited to, a brightness setting or an audio setting of the electronic device 106a. In an example, the neural network model 104 may be trained based on the time (e.g., a day-time, such as 9 AM-5 PM) or the location (e.g., a living room) of usage of the electronic device 106a and based on corresponding brightness setting (e.g., 70% brightness) or audio setting (e.g., 55% volume) of the electronic device 106a set during the usage at the corresponding time or location. The neural network model 104 may be trained on the correlation between the first device-usage information and the corresponding configuration values of the first plurality of settings. In some embodiments, the neural network model 104 may be trained on the correlation between different user profiles associated with the electronic device 106a and the corresponding configuration values of the first plurality of settings. Details of the correlation is described, for example, in FIGS. 3A, 3B, and 3C.

The neural network model 104 may include code and routines configured to enable a computing device, such as the processor 204 of the server 102, to perform one or more operations. In some embodiments, the neural network model 104 may be trained for the capability of one of the first set of electronic devices 106, for example the electronic device 106a. Additionally, or alternatively, the neural network model 104 may be implemented using hardware including a processor, a microprocessor (e.g., to perform or control performance of one or more operations), a field-programmable gate array (FPGA), or an application-specific integrated circuit (ASIC). In some other instances, the neural network model 104 may be implemented using a combination of hardware and software. Examples of the neural network model 104 may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), a Long Short Term Memory (LSTM) network based RNN, CNN+ANN, LSTM+ANN, a gated recurrent unit (GRU)-based RNN, a fully connected neural network, a deep Bayesian neural network, a Generative Adversarial Network (GAN), and/or a combination of such networks. In some embodiments, the neural network model 104 may include numerical computation techniques using data flow graphs. In certain embodiments, the neural network model 104 may be based on a hybrid architecture of multiple Deep Neural Networks (DNNs).

Each of the first set of electronic devices 106 may include suitable logic, circuitry, interfaces, and/or code that may be configured to perform one or more general purpose computing operations for one or more users/consumers. For example, each of the first set of electronic devices 106 may be configured to playback media content. In accordance with an embodiment, the first set of electronic devices 106 (for example the electronic device 106a) may be associated with the user 114. Each of the first set of electronic devices 106 may include the first capability information (for example hardware/software capability), which each of the first set of electronic devices 106 may transmit to the server 102. Each of the first set of electronic devices 106 may also be configured to transmit the first device-usage information of the corresponding electronic device to the server 102. Examples of the first set of electronic devices 106 may include, but are not limited to, a television, a media rendering device, a mobile phone, a cellular phone, a tablet computing device, a personal computer, a gaming console, a media player, a speaker device, a home theatre system, a digital camera, a head-mounted device, an automotive electronic device, an electronic musical instrument, or other consumer electronic device.

The second electronic device 108 may include suitable logic, circuitry, interfaces, and/or code that may be configured to perform one or more general purpose computing operations. For example, the second electronic device 108 may be configured to playback media content. The second electronic device 108 may be associated with the user 114 (for example same user with whom the electronic device 106a is associated). In accordance with an embodiment, the second electronic device 108 may be a new electronic device that may be configured based on settings of the first set of electronic devices 106 (i.e. on which the neural network model 104 may be trained). The second electronic device 108 may include the second capability information (i.e. hardware capability or software capability of the second electronic device 108), which may be transmitted to the server 102. Based on the transmission of the second capability information, the second electronic device 108 may receive, from the server 102, the second set of configuration values for the second plurality of settings of the second electronic device 108. In some embodiments, the second electronic device 108 may also receive the first device-usage information of the first set of electronic devices 106 from the server 102. The second electronic device 108 may be further configured based on the received second set of configuration values for the second plurality of settings and the first device-usage information. Further, based on the configuration and acquired usage of the second electronic device 108 for a predetermined time period, the second electronic device 108 may be further configured to transmit second device-usage information (i.e. indicate usage of own device) of the second electronic device 108 to the server 102. Examples of the second electronic device 108 may include, but are not limited to, a television, a media rendering device, a mobile phone, a cellular device, a tablet computing device, a personal computer, a gaming console, a media player, a speaker device, a sound bar, a home theatre system, a digital camera, a head-mounted device, an automotive electronic device, an electronic musical instrument, or other consumer electronic device.

The third electronic device 110 may include suitable logic, circuitry, interfaces, and/or code that may be configured to perform one or more general purpose computing operations. The third electronic device 110 may be associated with the user 114. In accordance with an embodiment, the third electronic device 110 may correspond to a new electronic device that may be communicatively coupled or connected to the second electronic device 108. In accordance with an embodiment, the third electronic device 110 may be a new electronic device that may be configured based on settings of the second electronic device 108. The third electronic device 110 may include the third capability information, which may be transmitted to the server 102, via the second electronic device 108. Based on a comparison of the third capability information with the second capability information, the third electronic device 110 may receive, from the server 102, a third set of configuration values for a third plurality of settings of the second plurality of settings and the first device-usage information. The third electronic device 110 may be further configured based on the received third set of configuration values for the third plurality of settings and the first device-usage information. Examples of the third electronic device 110 may include, but are not limited to, a television, a media rendering device, a mobile phone, a cellular device, a tablet computing device, a personal computer, a gaming console, a media player, a speaker device, a sound bar, a home theatre system, a digital camera, a head-mounted device, an automotive electronic device, an electronic musical instrument, or other consumer electronic device.

The communication network 112 may include a communication medium through which the server 102, the first set of electronic devices 106, the second electronic device 108, and the third electronic device 110 may communicate with one another. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the server 102 may be configured to receive a request for configuration of the second electronic device 108, from the second electronic device 108 (i.e. a new electronic device to be setup or configured). The request may be initiated by a user (such as, the user 114) associated with the second electronic device 108 and the first set of electronic devices 106. The received request for configuration of the second electronic device 108 may include the second capability information of the second electronic device 108. In an embodiment, each of the first capability information and the second capability information may include, but is not limited to, at least one of hardware capability information or software capability information, associated with the first set of electronic devices 106 and the second electronic device 108, respectively. Examples of the hardware capability information may include, but are not limited to, an image content rendering capability, an audio content rendering capability, a closed caption capability, a size of a display screen, a resolution of the display screen, a processor speed, a size of storage device, a hardware architecture, a type of an input device, a network capability, a type of in-built sensors, a battery capacity, or a power of an audio device. Examples of the software capability information may include, but are not limited to, a type and a version of an operating system (OS), a programing language support, a security setting, a version of web browser, a communication protocol, or a current application version related to an application service.

In an embodiment, the server 102 may include the trained neural network model 104 that may be pre-stored in a memory (e.g., a memory 206 of FIG. 2) of the server 102. The neural network model 104 may be trained based on the first device-usage information of the first set of electronic devices 106 and the first set configuration values for the first plurality of settings of the first set of electronic devices 106. In accordance with an embodiment, the first device-usage information may include information related to, but is not limited to, at least one of a time of usage, a location of usage, user-profile information of a plurality of users, a network connection status, identification information of a connected electronic device, a genre of content rendered, a mode of operation, or a user-input, associated with the first set of electronic devices 106. In accordance with an embodiment, the first plurality of settings may include, but is not limited to, at least one of a display setting, a font setting, a color setting, a power setting, an audio setting, a network setting, a user-interface setting, a closed caption setting, an application setting, an accessibility setting, a diagnostic setting, or a security setting, associated with the first set of electronic devices 106. The details related to the first device-usage information, the first configuration values of the first plurality of settings, and the training of the neural network model 104 are described, for example, in FIGS. 3A, 3B, and 3C.

The server 102 may be further configured to compare the received second capability information of the second electronic device 108 with the first capability information of the first set of electronic devices 106. In accordance with an embodiment, based on the comparison of the second capability information with the first capability information, the server 102 may be configured to determine the second set of configuration values for the second plurality of settings. The second plurality of settings may be a set from the first plurality of settings. The details of the comparison of capabilities of the first set of electronic devices 106 and the second electronic device 108, and the determination of the second set of configuration values are described, for example, in FIG. 4A. The server 102 may be further configured to transmit the second set of configuration values of the second plurality of settings along with the first device-usage information to the second electronic device 108 for configuration of the second electronic device 108.

The second electronic device 108 may be configured to receive the second set of configuration values for the second plurality of settings and the first device-usage information from the server 102 based on the request sent to the server 102. The second electronic device 108 may automatically receive configuration values of settings relevant for the second electronic device 108 (e.g., a new electronic device) based on the second capability information of the second electronic device 108 provided to the server 102. A new electronic device (e.g., the second electronic device 108) may be auto-configured based on determined settings (i.e., which may be relevant to the capabilities of the new electronic device) and based on the trained neural network model 104 which may be trained based on usage of a set of previous electronic devices (e.g., the first set of electronic devices 106). Thus, the relevant settings may be automatically transferred to a newer electronic device (i.e. for configuration of the newer electronic device) from the disclosed server 102 that may include the neural network model 104 trained based on the usage and existing settings of current or older electronic devices. Such auto-configuration of the settings of the new electronic device may reduce manual effort (i.e. referring UI menu and operational guides) to configure the new electronic device and may further increase configuration efficiency.

Figure 2:
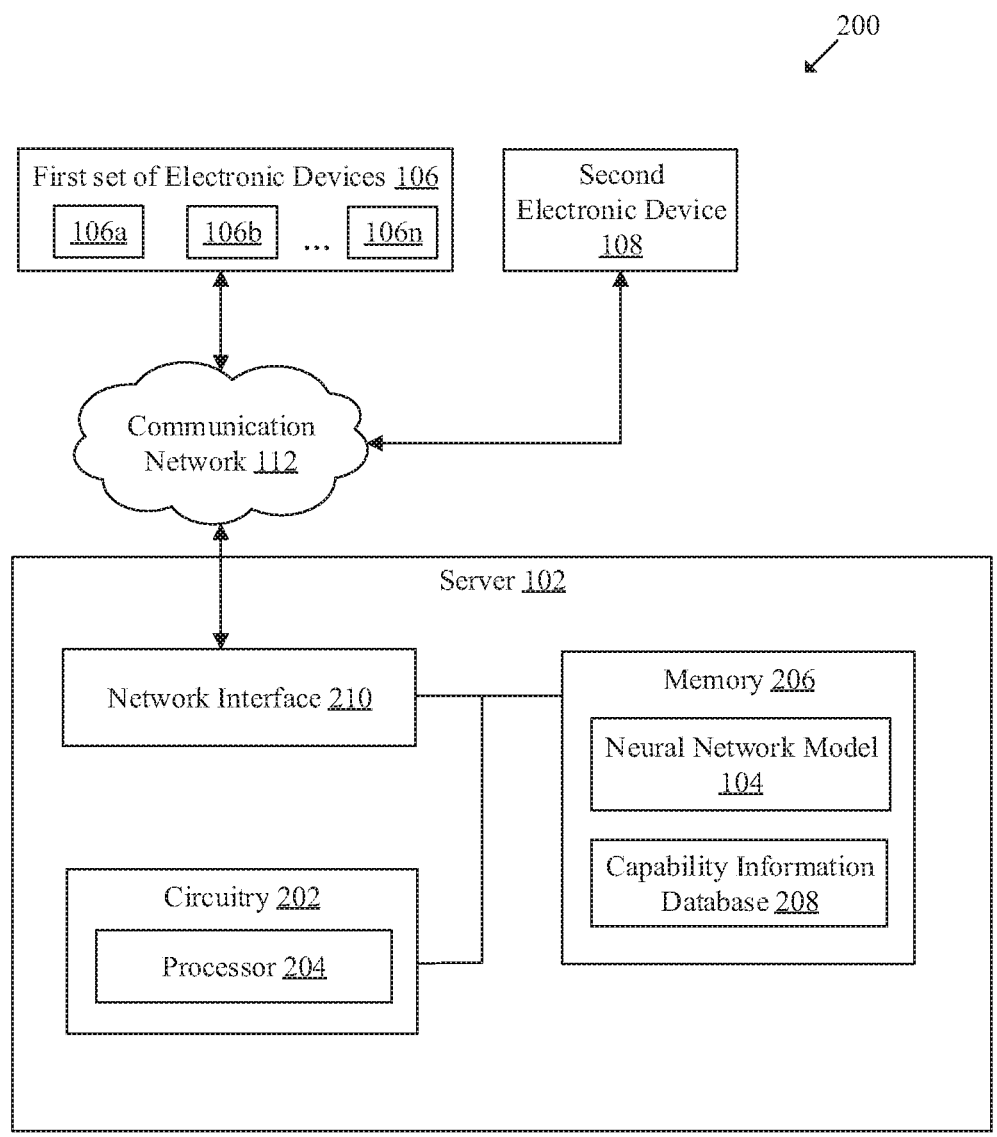
FIG. 2 is a block diagram that illustrates an exemplary server for configuration of settings based on a neural network model, in accordance with an embodiment of the disclosure.

FIG. 2 is a block diagram that illustrates an exemplary server for configuration of settings based on a neural network model, in accordance with an embodiment of the disclosure. FIG. 2 is explained in conjunction with elements from FIG. 1. With reference to FIG. 2, there is shown a block diagram 200 of the server 102 that may be coupled to the first set of electronic devices 106 and the second electronic device 108, via the communication network 112. The server 102 may include circuitry 202, which may include one or more processors, such as a processor 204. The server 102 may further include a memory 206, which may be configured to store the neural network model 104 and capability information database 208. The server 102 may further include a network interface 210 that may connect to the communication network 112.

The circuitry 202 may include suitable logic, circuitry, interfaces and/or code that may be configured to execute program instructions stored in the memory 206 and may be associated with different operations to be executed by the server 102. For example, some of the operations may include generation and storage of the neural network model 104 in the memory 206, reception of the second capability information, comparison of the second capability information with the first capability information, and determination of the second set of configuration values for the second plurality of settings based on the comparison. The operations may further include transmission of the determined second set of configuration values and the corresponding first device-usage information to the second electronic device 108 for the configuration. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The processor 204 may include suitable logic, circuitry, interfaces and/or code that may be configured to execute a set of instructions stored in the memory 206. The processor 204 may be configured to execute program instructions associated with different operations to be executed by the circuitry 202. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The memory 206 may include suitable logic, circuitry, interfaces, and/or code that may be configured to store the one or more instructions to be executed by the circuitry 202 and/or the processor 204. The memory 206 may be configured to store the neural network model 104. The memory 206 may be further configured to store the capability information database 208 that may at least include the first capability information of the first set of electronic devices 106 and the second capability information of the second electronic device 108. In some embodiments, the memory 206 may store the first device-usage information and the first configuration values of the first plurality of settings. Further, the memory 206 may store the second device-usage information and the second configuration values of the second plurality of settings. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card The network interface 210 may include suitable logic, circuitry, interfaces, and/or code that may be configured to facilitate communication between the server 102, the first set of electronic devices 106, and the second electronic device 108, via the communication network 112. The network interface 210 may be implemented by use of various known technologies to support wired or wireless communication of the server 102 with the communication network 112. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The operations of the circuitry 202 are described in detail, for example in FIGS. 3A, 3B, 3C, 4, and 5.

FIGS. 3A, 3B, and 3C are diagrams that collectively illustrate exemplary usage scenarios of an electronic device based on which a neural network model is trained, in accordance with an embodiment of the disclosure. FIGS. 3A, 3B, and 3C are described in conjunction with elements from FIG. 1 and FIG. 2. In FIGS. 3A, 3B, and 3C, there is shown a first table 302, a second table 310, and a third table 318, respectively. Each table illustrates exemplary values of a particular device-usage parameter in the first device-usage information and exemplary configuration values of exemplary settings in the first plurality of settings.

With reference to FIG. 3A, there is shown the first table 302 that includes exemplary information for a time of usage 304 of an electronic device (such as the electronic device 106a) of the first set of electronic devices 106, a first exemplary setting 306 of the electronic device 106a, and first exemplary configuration values 308 of the first exemplary setting 306. The time of usage 304 may indicate different time periods, where the electronic device 106a may be used. The first exemplary setting 306 may indicate one or more settings (hardware or software) of the electronic device 106a at a particular time of usage (i.e. first device-usage information). The first exemplary configuration values 308 may indicate explicit values or parameters of the settings. For example, the first table 302 shows that between 9 AM to 6 PM (i.e. time of usage 304), a display setting, an audio setting, and a power setting (i.e. first plurality of settings) of the electronic device 106a may be set to 70% brightness, 50% volume, and a normal power mode (i.e. first set of configuration values), respectively. For example, the user 114 of the electronic device 106a may prefer a higher brightness (say 70%), a medium volume (say 50%), and the normal power mode for the electronic device 106a during usage of the electronic device 106a in a day-time (say 9 AM to 6 PM). Further, as shown in the first table 302, between 6 PM to 9 PM (i.e. time of usage 304); the display setting, the audio setting, and the power setting (i.e. first plurality of settings) of the electronic device 106a may be set to 50% brightness, 70% volume, and normal power mode (i.e. first set of configuration values), respectively. In an example, the user may prefer a medium brightness (say 50%), a higher volume (say 70%), and the normal power mode for the electronic device 106a during usage of the electronic device 106a in an evening-time. In addition, the first table 302 also shows that between 9 PM to 9 AM (i.e. time of usage 304); the electronic device 106a may be set to 35% brightness, 35% volume, and a power saving mode (i.e. first set of configuration values) for the display setting, the audio setting, and the power settings (i.e. first plurality of settings), respectively. For example, the user may prefer a lower brightness (say 35%), a lower volume (say 35%), and a power saving mode for the electronic device 106a during usage of the electronic device 106a at a night-time and an early-morning time.

With reference to FIG. 3B, there is shown the second table 310 that includes exemplary information for a location of usage 312 of the electronic device 106a, a second exemplary setting 314 of the electronic device 106a, and second exemplary configuration values 316 of the second exemplary setting 314. The location of usage 312 may indicate a geo-location or a physical area in a building (such as, a certain room) where the electronic device 106a may be used. The second exemplary setting 314 may indicate one or more settings (hardware or software) of the electronic device 106a at a particular location of usage (i.e. first device-usage information). The second exemplary configuration values 316 may indicate explicit values or parameters of the settings. As shown in the second table 310, (for example) at a work location (i.e. location of usage 312); an audio setting, a network setting, and a power setting (i.e. first plurality of settings) of the electronic device 106a may be set to 35% volume, Office WLAN, and the normal power mode (i.e. first set of configuration values), respectively. For example, the user 114 of the electronic device 106a may prefer a lower volume (say 35%), connection to the Office WLAN, and the normal power mode for the electronic device 106a during usage of the electronic device 106a at the work location. Further, as shown in second table 310, at a home location (i.e., location of usage 312); the audio setting, the network setting, and the power setting (i.e. first plurality of settings) of the electronic device 106a may be set to 75% volume, a Home Wi-Fi network, and the normal power mode (i.e. first set of configuration values), respectively. For example, the user 114 of the electronic device 106a may prefer a higher volume (say 75%), a connection to the Home Wi-Fi network, and the normal power mode for the electronic device 106a during usage of the electronic device 106a at the home location. In addition, as shown in second table 310, at an outdoor location (i.e., location of usage 312); the audio setting, the network setting, and the power setting (i.e. first plurality of settings) of the electronic device 106a may be set to 55% volume, a cellular network, and the power saving mode (i.e. first set of configuration values), respectively. For example, the user 114 of the electronic device 106a may prefer a medium volume (say 55%), a connection to the cellular network, and the power saving mode for the electronic device 106a during usage of the electronic device 106a at the outdoor location.

With reference to FIG. 3C, there is shown the third table 318 that includes exemplary information for user profile information 320 of the electronic device 106a, a third exemplary setting 322 of the electronic device 106a, and third exemplary configuration values 324 of the electronic device 106a. The user profile information 320 may include, but is not limited to, an identification of the user 114, an age of the user 114, a gender of the user 114, or a category of the user 114. The third exemplary setting 322 may indicate one or more settings (hardware or software) of the electronic device 106a when used by the user 114 of a certain user profile (e.g., a child user, an adult user, or an elderly user as shown in FIG. 3C). The third exemplary configuration values 324 may indicate explicit values or parameters of the settings. As shown in the third table 318, (for example) for a child user (i.e., user profile information 320); an accessibility setting, a closed caption setting, and a security setting (i.e., first plurality of settings) of the electronic device 106a may be set to an accessibility "OFF" mode, a closed caption setting "OFF" mode, and a parental control "ON" mode. For example, a child user (e.g., the user 114) may not require the accessibility mode and closed caption mode to be set as "ON". However, the parental control mode may be required to be set as "ON" for the child user to prevent the child user from viewing inappropriate media content on the electronic device 106a. Further, as shown in the third table 318, for an adult user (i.e., user profile information 320); the accessibility setting, the closed caption setting, and the security setting (i.e., first plurality of settings) of the electronic device 106a may be set to the accessibility setting "OFF" mode, the closed caption setting "ON" mode in English language, and the parental control "OFF" mode, respectively. For example, an adult user (e.g., the user 114) may not require the accessibility mode and parental control mode; which may be set to an "OFF" state. However, the adult user may prefer closed caption texts in a language of choice, such as, English language. In addition, the third table 318 also shows that for an elderly user (i.e., user profile information 320); the accessibility setting, the closed caption setting, and the security setting (i.e., first plurality of settings) of the electronic device 106a may be set to the accessibility "ON" mode, the closed caption "ON" mode for a native language, and the parental control "OFF" mode, respectively. For example, an elderly user (e.g., the user 114) may require the accessibility mode for better view of media content and ease of use. Further, the elderly user may prefer closed caption texts in a native language of choice. However, parental control mode may not be required for the elderly user.

It should be noted that information provided in each of the first table 302, the second table 310, and the third table 318 is presented merely as an example to indicate the correlation between device-usage information (e.g., the first device-usage information) and configuration values (e.g., the first set of configuration values) of settings (e.g., the first plurality of settings) of the electronic device 106a (i.e. one of the first set of electronic devices 106) and may not be construed as limiting for the disclosure. The present disclosure may be applicable to different types of settings and related configuration values for various electronic devices, without any deviation from the scope of the disclosure. The correlation between the first device-usage information and the first set of configuration values of the first plurality of settings may be associated with the electronic device 106a (i.e. one of the first set of electronic devices 106) used by the user 114.

In accordance with an embodiment, the first device-usage information may include information related to, but not limited to, at least one of the time of usage 304, the location of usage 312, the user profile information 320 of a plurality of users, a network connection status, identification information of a connected electronic device (for example the third electronic device 110), a genre of content rendered, a mode of operation, or a user-input, associated with the electronic device 106a. Further, examples of the first plurality of settings may include, but are not limited to, at least one of a display setting, a font setting, a color setting, a power setting, an audio setting, a network setting, a user-interface setting, a closed caption setting, an application setting, an accessibility setting, a diagnostic setting, or a security setting, associated with the first set of electronic devices 106 as shown in FIGS. 3A-3C. In accordance with an embodiment, the circuitry 202 of the server 102 may train the neural network model 104 based on the correlation of the first device-usage information and the first set of configuration values for the first plurality of settings of the electronic device 106a. The circuitry 202 may be further configured to control the trained neural network model 104 to output the first set of configuration values for the first plurality of settings based on the first device-usage information input to the trained neural network model 104. In some embodiments, the neural network model 104 may be trained based on correlation between device usage information and configuration values for the settings of multiple electronic devices (such as the first set of electronic devices 106).

In accordance with an embodiment, the neural network model 104 may be trained to output the first set of configuration values for the first plurality of settings based on capability information (such as the first capability information) and the first device-usage information. For example, the trained neural network model 104 may provide particular configuration values (as shown in FIGS. 3A-3C) for different settings of the electronic device 106a based on particular usage (i.e. time, location, user profile, or rendered content) and the capabilities (hardware or software capabilities) of the electronic device 106a. The automatic configuration of the second electronic device 108 (such as, a new or unconfigured electronic device) based on the second capability information of the second electronic device 108 and the neural network model 104 trained based on the electronic device 106a is described, for example, in FIG. 4A.

Figure 4A:
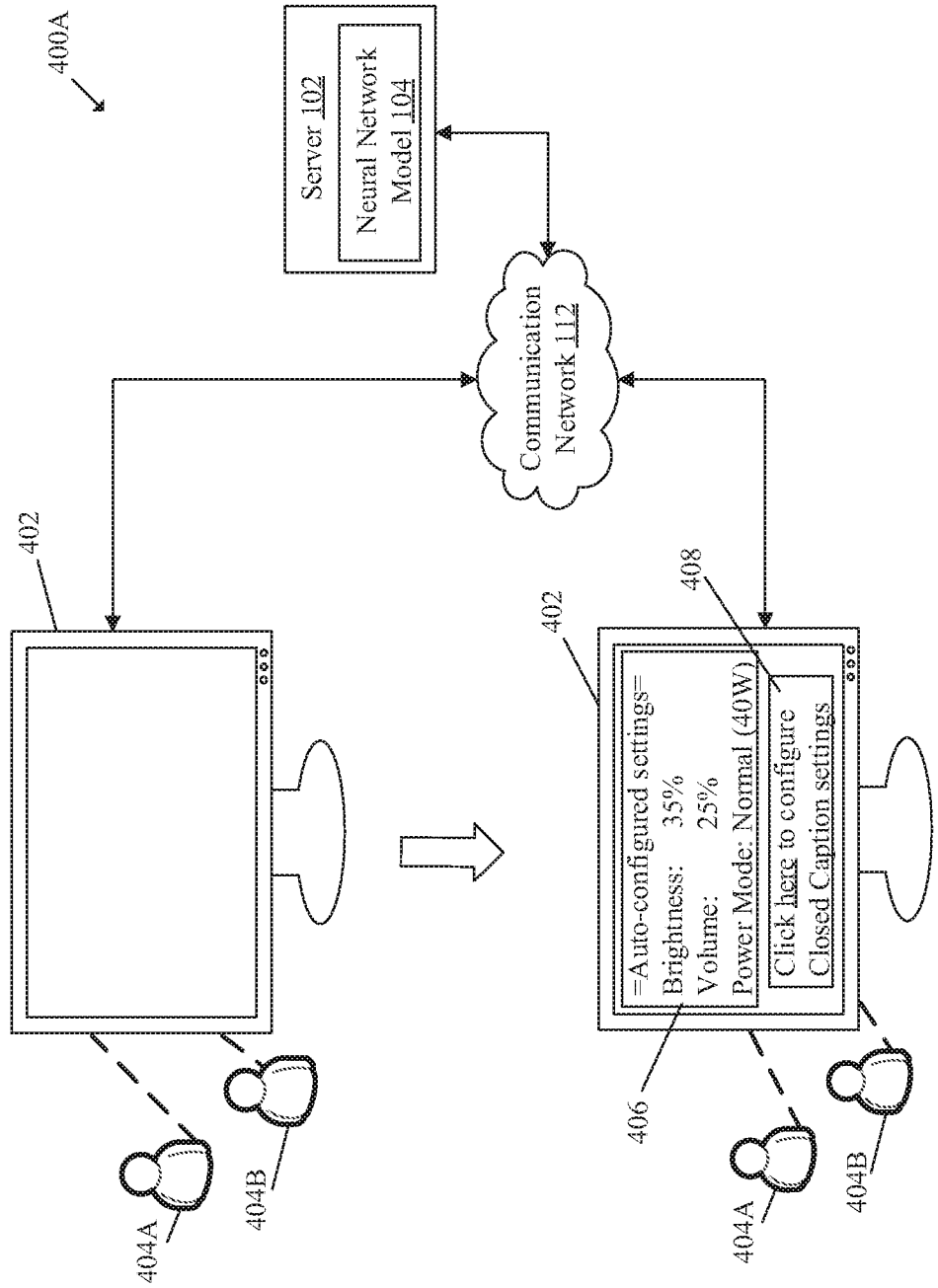
FIGS. 4A and 4B are diagrams that collectively illustrate exemplary scenarios for configuration of settings based on a neural network model, in accordance with an embodiment of the disclosure.
Figure 4B:
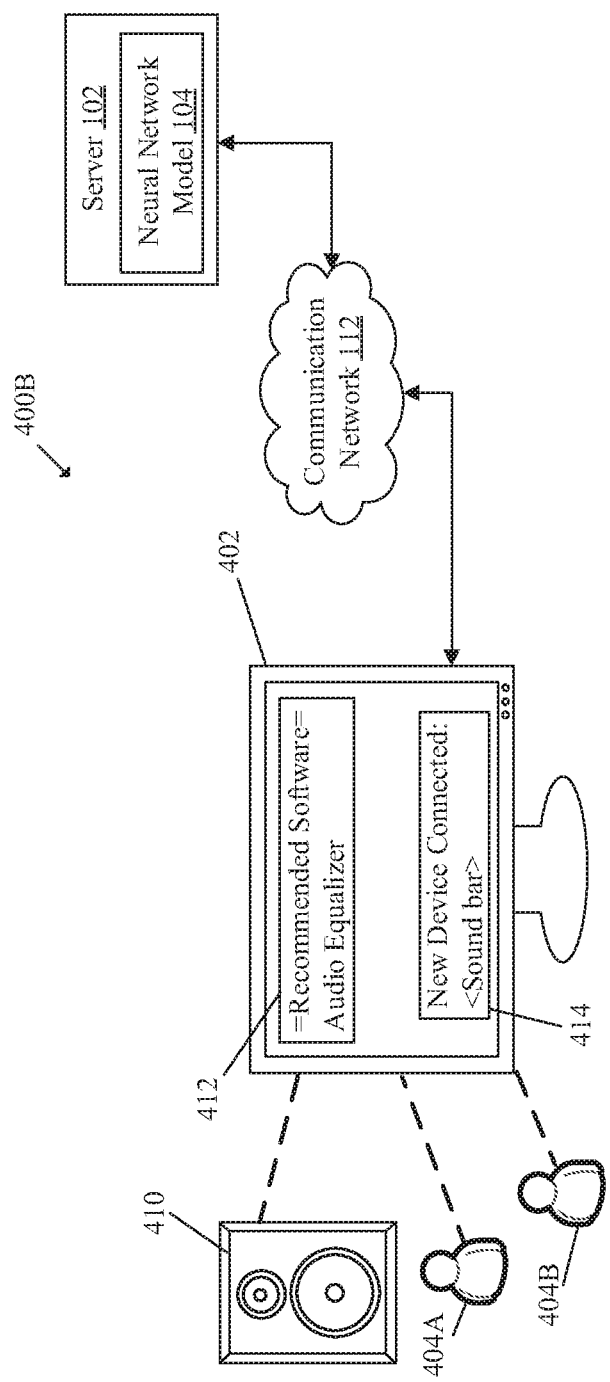

FIGS. 4A and 4B are diagrams that collectively illustrate exemplary scenarios for configuration of settings based on a neural network model, in accordance with an embodiment of the disclosure. FIGS. 4A and 4B are described in conjunction with elements from FIGS. 1, 2, 3A, 3B, and 3C. With reference to FIG. 4A, there is shown an exemplary scenario 400A that includes a second electronic device 402 (for example a television (TV)), a first user 404A, and a second user 404B. The second electronic device 402 may be similar to the second electronic device 108 shown in FIG. 1. In certain embodiments, for example, the first user 404A may be an adult user, while the second user 404B may be a child user who may be associated with the first user 404A. The second electronic device 402 may be communicatively coupled to the server 102 (that may include the neural network model 104), via the communication network 112. In accordance with an embodiment, the second electronic device 402 may be associated with the first user 404A and may be a new electronic device that may not initially be configured for usage (for example recently purchased or manufactured device). It may be noted that the second electronic device 402, shown in FIG. 4A, is presented merely as an example of the second electronic device 108, of FIG. 1. The present disclosure may be also applicable to other types of electronic devices such as, a display device, a mobile phone, a home theatre system, a smart speaker, and the like. A description of other types of electronic devices has been omitted from the disclosure for the sake of brevity. Further, shown in FIG. 4A are user-interface (UI) elements, such as, a first UI element 406, and a second UI element 408, of the second electronic device 402.

In accordance with an embodiment, the memory 206 of the server 102 may store the neural network model 104 trained based on the first device-usage information of the electronic device 106a (or one of the first set of electronic devices 106 not shown in FIG. 4A) and the first set of configuration values for the first plurality of settings of the electronic device 106a as described, for example, in FIGS. 3A-3C. The electronic device 106a (or the first set of electronic devices 106) may be an old or current electronic device associated with the same user (such as the first user 404A) and may already be configured based on the first plurality of settings of the electronic device 106a. For instance, the electronic device 106a may correspond to another television used currently or in the past by the first user 404A and/or the second user 404B.

In an embodiment, the electronic device 106a may include the first capability information that may correspond to the first plurality of settings of the electronic device 106a. In accordance with an embodiment, the first capability information may comprise at least one of hardware capability information or software capability information, associated with the electronic device 106a. Examples of the hardware capability information may include, but are not limited to, an image content rendering capability, an audio content rendering capability, a closed caption capability, a size of a display screen, a resolution of the display screen, a processor speed, a size of storage device, a hardware architecture, a type of an input device, a network capability, a type of in-built sensors, a battery capacity, or a power of an audio device. Examples of the software capability information may include, but are not limited to, a type and a version of an operating system (OS), a programming language support, a security setting, a version of web browser, a communication protocol, or a current application version related to an application service.

In an embodiment, the circuitry 202 may be configured to receive the second capability information of the second electronic device 402 from the second electronic device 402. In an embodiment, the second electronic device 402 may have the same capability as the electronic device 106a in case the second electronic device 402 is of the same manufacturer or brand as the electronic device 106a. In an embodiment, the circuitry 202 of the server 102 may be further configured to compare the second capability information of the second electronic device 402 (i.e., a new electronic device) with the first capability information of the electronic device 106a (one of the first set of electronic devices 106 based on which the neural network model 104 on the server 102 is already trained). In accordance with an embodiment, the circuitry 202 may be further configured to determine the second set of configuration values for the second plurality of settings based on the comparison of the second capability information with the first capability information. Thus, a trained neural network model 104 on the disclosed server 102 may automatically identify configuration setting values for a previous or old electronic device (i.e. the electronic device 106a) and determine configuration setting values for new electronic device (i.e. the second electronic device 108) based on capabilities of the previous/old electronic device and capabilities of the new electronic device.

In an example, the second capability information of the second electronic device 402 may be same as the first capability information of the electronic device 106a, in case the second electronic device 402 and the electronic device 106a are of a same manufacturer or a same brand. In such case, the circuitry 202 may determine the second plurality of settings of the second electronic device 402 as same as the first plurality of settings of the electronic device 106a. Further, the circuitry 202 may determine that the second set of configuration values for the second plurality of settings as same as the first set of configuration values for the first plurality of settings.

In another example, a capability (i.e., the second capability information) of the second electronic device 402 may be lower than a capability (i.e., the first capability information) of the electronic device 106a. For example, the first capability information may indicate that the electronic device 106a supports high dynamic range (HDR) based display and closed caption text features, however, the second capability information may indicate the second electronic device 402 supports a non-HDR based display with no closed caption text support. In such case, the circuitry 202 may determine the second plurality of settings as a sub-set of the first plurality of settings, where the second plurality of settings may exclude an HDR setting and a closed-captioned text setting, which may be included in the first plurality of settings. The circuitry 202 of the server 102 may further determine the second set of configuration values for the second plurality of settings (i.e., the remaining settings in the first plurality of settings excluding the HDR setting and the closed-caption text setting), based on the neural network model 104 stored on the server 102.

In yet another example, a capability (i.e., the second capability information) of the second electronic device 402 may be higher than a capability of the electronic device 106a (i.e., the first capability information). For example, the second capability information may indicate that the second electronic device 402 supports a high resolution display (such as, a high definition (HD) display), however, the first capability information may indicate that the electronic device 106a supports a standard resolution display (such as, a standard definition (SD) display). In such case, the circuitry 202 may translate configuration values (for example resolution of display screen) of the SD display setting of the electronic device 106a to configuration values (for example resolution) of the HD display setting for the second electronic device 402. For example, a display resolution (i.e. 720*480 pixels) of the SD display setting of the electronic device 106a may be increased or translated to a display resolution (i.e. 1280*720 pixels) of the HD display setting for the second electronic device 402. The translated display resolution may correspond to the second set of configuration values for the setting (for example display setting) determined for the configuration of the second electronic device 402.

The circuitry 202 may transmit, via the communication network 112, the determined second set of configuration values for the second plurality of settings and the corresponding first device-usage information to the second electronic device 402 for configuration of the second electronic device 402. Each setting in the second plurality of settings may be assigned an associated configuration value in the second set of configuration values for the configuration of the second electronic device 402. For example, the assigned configuration value for the second plurality of settings may be same or translated value of one the first exemplary configuration values 308, the second exemplary configuration values 316, or the third exemplary configuration values 324 as shown in FIGS. 3A, 3B, and 3C. Further, the transmission of the first device-usage information of the electronic device 106a to the second electronic device 402 (i.e. new device) may enable the second electronic device 402 to also operate based on the stored first device-usage information of the electronic device 106a (i.e. old electronic device associated to the user 114). Thus, a new electronic device (i.e. the second electronic device 402) may be configured based on same/different configuration values of the same/sub-set of settings of an old electronic device (i.e. the electronic device 106a) and further based on the corresponding usage information of the old electronic device, by use of the trained neural network model 104 stored on the server 102.

In another example, the electronic device 106a (e.g., a Television) may have a power rating of 20 W (a power capability in the first capability information) in the normal power mode. The electronic device 106a may operate at 70% brightness, 50% volume, and the normal power mode in the daytime between 9 AM to 6 PM (as shown in the first table 302 of FIG. 3A). Further, the second electronic device 402 may operate in the daytime between 9 AM to 6 PM and may have a power rating of 40 W (a power capability in the second capability information) in the normal power mode. On comparison of the power ratings (in the first capability information and the second capability information) of the electronic device 106a and the second electronic device 402, the circuitry 202 may determine that the second electronic device 402 may consume twice the power than that consumed by the electronic device 106a. Hence, for the daytime between 9 AM to 6 PM usage (i.e. the first device-usage information), the circuitry 202 may determine and transmit the display setting of 35% brightness and the audio setting of 25% volume (i.e. second set of configuration values), to the second electronic device 402. Thus, for the second electronic device 402, the circuitry 202 may automatically set or determine the brightness and the volume values (i.e. second set of configuration values) as half of the corresponding values (i.e. first set of configuration values) of the electronic device 106a, since the power rating of the second electronic device 402 (i.e., 40 W) is twice than that of the electronic device 106a (i.e., 20 W), as an example. The second electronic device 402 may be further configured to control the initial setup or configuration based on the second set of configuration values for the second plurality of settings determined by the server 102.

It should be noted that, the second electronic device 402 with a blank display screen has been illustrated in FIG. 4A as an initial state of the second electronic device 402, prior to the auto-configuration of the settings of the second electronic device 402. Based on the completion of the auto-configuration, the second electronic device 402 may display information about the second set of configuration values of the second plurality of settings (for example, brightness, volume, and power mode) on the first UI element 406 of the second electronic device 402 as illustrated in FIG. 4A. The automatic configuration of the settings of the second electronic device 402 (i.e. new electronic device) by the disclosed server 102 (i.e. trained based on old electronic device 106a) may facilitate the user 114 to avoid manual effort (i.e. referring UI menu and operational guides) to configure the new electronic device. This further increase configuration process efficiency to an extent.

In an embodiment, the circuitry 202 of the server 102 may be further configured to train the neural network model 104 based on a set of preferences (for example a particular configuration values for one or more settings) of a manufacturer of the second electronic device 402. In another embodiment, the neural network model 104 may be trained based on a set of user preferences associated with the first set of configuration values of the first plurality of settings and/or the first device-usage information of the electronic device 106a. In such cases, the circuitry 202 may be configured to auto-configure a new electronic device, such as, the second electronic device 402, based on the neural network model 104 trained based on the set of preferences of the manufacturer or the set of user preferences. For example, the set of preferences of the manufacturer or the set of user preferences may include certain configuration values for a brightness setting, an audio setting, and a power mode, when the electronic device 106a may be operated at a pre-determined time interval during a day (i.e. first device-usage information). The circuitry 202 may further auto-configure the second electronic device 402 for operation (say during the pre-determined time interval) based on the preferred configuration values for the brightness setting, the audio setting, and the power mode, on which the neural network model 104 may be trained.

In accordance with an embodiment, the circuitry 202 of the server 102 may be configured to receive, from the second electronic device 402, a user-input associated with a setting of the second plurality of settings already configured on the second electronic device 402. For example, the second electronic device 402 may receive the user-input from the first user 404A, where the user-input may be associated with configuration of a closed caption setting for media content playback on the second electronic device 402. In an example, the user-input received from the first user 404A may be a request to turn "ON" the closed caption setting of the second electronic device 402 after the configuration of the second electronic device 402 done based on the second plurality of settings. The second electronic device 402 may further transmit the received user-input to the circuitry 202 of the server 102. Thereafter, the circuitry 202 of the server 102 may be configured to transmit, to the second electronic device 402, a user-interface (UI) element (such as, the second UI element 408 shown in FIG. 4A) to configure the requested setting on the second electronic device 402 based on the received user-input. The second electronic device 402 may further receive and render the received second UI element 408 as shown in FIG. 4A. The second UI element 408 may include a shortcut, a Uniform Resource Locator (URL), or a hyperlink that may direct the first user 404A to a UI (or setting/configuration menu) related to configuration of the desired setting (such as, the closed caption language setting on the second electronic device 402). For example, the second UI element 408 may include a hyperlink: "Click here to configure closed caption language settings" as shown in FIG. 4A. Based on receipt of a user-click command on the second UI element 408 from a user (e.g., the first user 404A), the second electronic device 402 may direct the first user 404A to a configuration menu associated with the language settings of closed caption text, where the second electronic device 402 may allow the first user 404A to easily set the closed caption as "ON" or "OFF" and also set his/her language of choice for closed captions if the closed caption is set as "ON. In some embodiments, the second electronic device 402 may automatically configure the closed caption settings (for example) on the second electronic device 402 based on the receipt of information (i.e. shortcut, URL, or hyperlink) about the second UI element 408.

In another embodiment, based on the receipt of the user-input (i.e. associated with the requested setting of the second plurality of settings) from the first user 404A, the second electronic device 402 may auto-configure the requested setting without the transmission of the user-input to the server 102. In an example, the user-input may indicate a certain setting of the second electronic device 402. Based on the indicated setting, the second electronic device 402 may search for a menu option associated with the corresponding setting and may present an UI element (such as the second UI element 408) associated with the corresponding setting, to the first user 404A to further configure the second electronic device 402. In another example, the user-input may also include a user-provided configuration value for a particular setting (for example 50% brightness of the display setting). Based on such user-input, the second electronic device 402 may auto-configure the second electronic device 402 based on the user-provided configuration value of the particular setting.

In accordance with an embodiment, the circuitry 202 of the server 102 may be further configured to re-train the stored neural network model 104 based on the received user-input associated with the desired setting for the second electronic device 402. For example, the circuitry 202 may re-train the neural network model 104 based on identification information of the first user 404A (which may correspond to a user profile of the first user 404A) and the configuration value of the setting (for example closed caption language setting) included in the user-input provided by the first user 404A. Thus, the circuitry 202 of the server 102 may re-train the neural network model 104 to learn the preferences of the first user 404A for the recently updated setting (i.e. the setting associated with the user-input) on the second electronic device 402.

In accordance with an embodiment, the circuitry 202 may be further configured to receive second device-usage information from the second electronic device 402, based on the configured second plurality of settings. Examples of the second device-usage information, may include, but are not limited to, a time of usage, a location of usage, user-profile information of a plurality of users, a network connection status, identification information of a connected electronic device, a genre of content rendered, a mode of operation, or a user-input, associated with the second electronic device 402, similar to the first device-usage information of the electronic device 106a as described, for example in FIGS. 3A-3C. The second electronic device 402 may generate or acquire the second device-usage information which may indicate the usage of the second electronic device 402 over a period of time after the configuration of the second plurality of settings. The second device-usage information may indicate how the second electronic device 402 has been used by the first user 404A over the period of time after being configured. The circuitry 202 of the server 102 may be further configured to re-train the neural network model 104 based on the received second device-usage information of the second electronic device 402. For example, the circuitry 202 may re-train the neural network model 104 based on, but not limited to, the time of usage, the location of usage, and the user-profile information of one or more users of the second electronic device 402, as described, for example, in the first table 302, the second table 310, and the third table 318, in FIGS. 3A, 3B, and 3C, respectively. Thus, the retrained neural network model 104 based on the first device-usage information of the electronic device 106a (or the first set of electronic devices 106) and the second device-usage information of the configured second electronic device 402 may further enhance an accuracy of the neural network model 104 due to enhancement in a training dataset of the neural network model 104.

In an embodiment, the circuitry 202 may correlate the determined second set of configuration values for the second plurality of settings of the second electronic device 402 and the received second device-usage information of the second electronic device 402. Based on the correlation of the second set of configuration values and the second device-usage information, the circuitry 202 may re-train the neural network model 104. Thus, the neural network model 104 may be trained (or re-trained) based on configuration values of settings and device-usage information of multiple electronic devices (e.g., the electronic device 106a and the second electronic device 402) associated with a certain user (such as, the first user 404A). Such trained (or re-trained) neural network model 104 on the disclosed server 102 may have an increased accuracy due to storage of preferences/usage (i.e. training dataset) for different electronic devices (i.e. with same or different capabilities).

With reference to FIG. 4B, there is shown a second scenario 400B that may include the second electronic device 402 and a third electronic device 410 (e.g., a sound bar) that may be communicatively coupled or connected to the second electronic device 402. It may be noted that the third electronic device 410, shown in FIG. 4B, is presented merely as an example of the third electronic device 110 of FIG. 1. The present disclosure may be also applicable to other types of electronic devices such as, a display device, a mobile phone, a home theatre system, a smart speaker, and the like. A description of other types of electronic devices has been omitted from the disclosure for the sake of brevity. In the second scenario 400B, there is further shown a third UI element 412 and a fourth UI element 414 rendered on the second electronic device 402.

In accordance with an embodiment, the circuitry 202 of the server 102 may be further configured to receive information related to a connection of the second electronic device 402 (e.g., the TV) with the third electronic device 410 (e.g., the sound bar). The third electronic device 410 may be another new electronic device (i.e. not configured) connected with the second electronic device 402 (i.e. already configured based on the second plurality of settings received from the server 102). The second electronic device 402 may detect the connection of the second electronic device 402 with the third electronic device 410, and may display an indication of the connection in the fourth UI element 414. For example, as shown in FIG. 4B, the second electronic device 402 may display an indication—"New Device Connected: <Sound bar>" in the fourth UI element 414. In an embodiment, the second electronic device 402 may transmit the information related of the connection of the third electronic device 410 with the second electronic device 402, to the circuitry 202 of the server 102.

Further, the circuitry 202 of the server 102 may be configured to receive third capability information of the third electronic device 410 from the second electronic device 402. The second electronic device 402 may retrieve the third capability information from the third electronic device 410. Alternatively, in case the third electronic device 410 is directly communicably coupled to the server 102, the circuitry 202 may receive the third capability information of the third electronic device 410, directly from the third electronic device 410. The circuitry 202 may be configured to compare the third capability information of the third electronic device 410 with the second capability information of the second electronic device 402. The circuitry 202 may further determine a third set of configuration values for a third plurality of settings (i.e. same of subset of the second plurality of settings) of the third electronic device 410 based on the comparison of the third capability information with the second capability information, as described, for example, in FIG. 4A. For example, the third electronic device 410 may be a sound bar that may not have a display capability (i.e. third capability information), while the second electronic device 402 may be a television with both the display and audio capabilities (i.e. second capability information). In such case, the second set of configuration values of the display settings of the second electronic device 402 may not be determined and transferred to the third electronic device 410. In another example, an output power (i.e. the third capability information) of an audio speaker of the third electronic device 410 may be high (say of a high wattage) as compared to an output power (i.e. the second capability information) of a speaker of the second electronic device 402. Thus, based on the comparison of the respective output powers (i.e. the second capability information and the third capability information), the circuitry 202 may determine the third set of configuration values for the third plurality of settings for the third electronic device 410, where the third set of configuration values may be same or translated from the second set of configuration values of the second electronic device 402. Further, the third plurality of settings may be the same or a subset of the second plurality of settings. For example, due to higher audio output power of the third electronic device 410, the circuitry 202 of the server 102 may increase or translate an amplification gain (in dB) of the output power (i.e. second set of configuration values) of the audio setting of the second electronic device 402, where the increased or translated amplification gain may correspond to the third set of configuration values of the audio setting (i.e. third plurality of settings) for the configuration of the third electronic device 410. The increased or translated amplification gain (in dB) of the audio setting for the third electronic device 410 may be determined by the circuitry 202 based on the comparison of the third capability information and the second capability information. The circuitry 202 of the server 102 may be further configured to transmit the determined third set of configuration values for the third plurality of settings and the corresponding first device-usage information to the third electronic device 410 for configuration of the third electronic device 410, via the second electronic device 402, or directly.

In another example, in case the volume (i.e. second configuration value) of the audio setting of the second electronic device 402 (e.g., a Television) is 20% or above and a multi-channel sound capability (i.e. an audio capability in the third capability information) is supported by the third electronic device 410, the circuitry 202 of the server 102 may be configured to auto-enable a surround sound feature in the audio setting of the third electronic device 410 (e.g., connected sound bar). The enabled surround sound feature may correspond the third configuration value of the third plurality of settings of the third electronic device 410. Further, the circuitry 202 may transmit the third configuration value (or the third set of configuration values) of the third plurality of settings to the third electronic device 410 for the configuration of the third electronic device 410 (i.e. new device connected with the configured second electronic device 402).

In accordance with an embodiment, the circuitry 202 may be further configured to receive third device-usage information from the third electronic device 410, via the second electronic device 402, based on the configured third plurality of settings. The third device-usage information of the third electronic device 410 may be similar to the first device-usage information of the electronic device 106a or the second device-usage information of the second electronic device 402 as described, for example in FIGS. 3A-3C and 4A. The third device-usage information may indicate the usage (i.e. but not limited to, usage in particular time, usage in particular location, or user profile) of the third electronic device 410 by the user (i.e. first user 404A) after the configuration of the third plurality of settings on the third electronic device 410. The circuitry 202 may be further configured to re-train the neural network model 104 based on the received third device-usage information of the third electronic device 410. For example, the third device-usage information may indicate how the third electronic device 410 has been used by the first user 404A based on the configuration. In an embodiment, the circuitry 202 of the server 102 may further re-train the neural network model 104 based on the received third device-usage information. In an embodiment, the circuitry 202 of the server 102 may correlate the determined third set of configuration values for the third plurality of settings of the third electronic device 410 and the received third device-usage information of the third electronic device 410. Based on the correlation of the third set of configuration values and the third device-usage information, the circuitry 202 may re-train the neural network model 104. The correlation may be similar to information described, for example, in the first table 302, the second table 310, and the third table 318, shown in FIGS. 3A, 3B, and 3C. Thus, the neural network model 104 re-trained based on the first device-usage information, the second device-usage information, and the third device-usage information for multiple devices (i.e. first set of electronic devices 106, the second electronic device 402, and the third electronic device 410) may further enhance the accuracy of the neural network model 104 to automatically configure future new electronic devices associated with the same users (for example the first user 404A).

In accordance with an embodiment, the electronic device 106a (or the first set of electronic devices 106 may include a plurality of user profiles for which the neural network model 104 may be trained. With reference to FIG. 3C, profiles related a child user, an adult user, and an elder user may correspond to the plurality of user profiles related to the electronic device 106a. In accordance with an embodiment, the circuitry 202 of the server 102 may receive information of a user profile of the plurality of user profiles from the second electronic device 402. The user profile may be a profile or identification of a user who may be currently using or configuring the second electronic device 402. In another words, the information of the user profile received by the server 102 may indicate which particular user (i.e., a user whose user profile may be stored in the neural network model 104) may be currently using the second electronic device 402 (i.e., the new electronic device). For example, the second electronic device 402 may transmit the information related to the first user 404A, who may be an adult user, to the circuitry 202. In another example, the second electronic device 402 may transmit the information related to the second user 404B (for example who may be a child user) to the circuitry 202.

In an embodiment, the circuitry 202 may further determine a fourth set of configuration values for a fourth plurality of settings (i.e. same or sub-set of the first plurality of settings) based on the application of the neural network model 104 on the received information of the user profile. The circuitry 202 may further transmit the determined fourth set of configuration values for the fourth plurality of settings and the corresponding first device-usage information to the second electronic device 402 for configuration with respect to the user profile. For example, in case of the first user 404A as an adult user, with reference to the exemplary values of the third table 318 in FIG. 3C, the circuitry 202 may determine and transmit the fourth configuration value (i.e. "parental control "OFF" mode) for the security settings of the second electronic device 402 for the first user 404A. Thus, for the user profile of the first user 404A (i.e. an adult user), the second electronic device 402 may be configured with a disabled parental control option. In another example of the second user 404B as a child user, with reference to the third table 318 of FIG. 3C, the circuitry 202 may determine and transmit the fourth configuration value (i.e. "parental control "ON" mode") for the security settings of the second electronic device 402 for the second user 404B. Thus, for the user profile of the second user 404B (i.e. a child user), the second electronic device 402 may be configured with an enabled parental control option. Thus, the disclosed server 102 may automatically determine and transfer configuration values of settings to new electronic devices not only based on the capability of the new electronic devices but also based on the user profiles (i.e. on which the neural network model 104 may be trained) of users that may use the new electronic devices.

In accordance with an embodiment, the circuitry 202 of the server 102 may be further configured to determine one or more services supported by the second electronic device 402 based on the received second capability information from the second electronic device 402. The circuitry 202 may be further configured to transmit, to the second electronic device 402, notification information associated with one or more applications based on the determined one or more services supported by the second electronic device 402. In an embodiment, the memory 206 of the server 102 may store an association between the second capability information of the second electronic device 402 and the supported one or more services. In an example, the association may be stored as a look-up table in the memory 206 of the server 102. The circuitry 202 may compare the received second capability information with the stored look-up table and may determine the one or more services supported by the second electronic device 402 based on the comparison. For an example, the hardware capability (i.e. second capability information) of the second electronic device 402 may indicate that the second electronic device 402 may have audio signal processing capabilities. Thus, based on received information about such hardware capability of the second electronic device 402, the circuitry 202 may determine that the second electronic device 402 may support an audio equalization application software (i.e. one or more services). The circuitry 202 may further transmit the notification information indicative of the audio equalization application software to the second electronic device 402. The second electronic device 402 may further display the notification information (for example as "Recommended software="Audio Equalizer") within the third UI element 412 for the user (such as the first user 404A) as shown in FIG. 4B. The second electronic device 402 may receive a user-input from the first user 404A to select the displayed notification information to further configure or install the one or more supported services (for example audio equalization application software) on the second electronic device 402.

In accordance with an embodiment, the circuitry 202 of the server 102 may further configured to receive, from the second electronic device 402, updated second capability information associated with a software upgrade on the second electronic device 402. The circuitry 202 may further compare the updated second capability information of the second electronic device 402 with the first capability information of the first set of electronic devices 106 (or the electronic device 106a). Thereafter, the circuitry 202 may determine a fifth set of configuration values for a fifth plurality of settings (i.e. same or subset of the first plurality of settings) based on the comparison of the updated second capability information with the first capability information. Further, the circuitry 202 may transmit the determined fifth set of configuration values for the fifth plurality of settings and the corresponding first device-usage information to the second electronic device 402 for configuration of the second electronic device 402.

For example, the second electronic device 402 may prompt a user (e.g., the first user 404A) to indicate an availability of a software update for the second electronic device 402. The prompt may be to download or install the available software update (such as, but is not limited to, an operating system (OS) upgrade, or new application version) on the second electronic device 402. In an example, the OS update of the second electronic device 402 may be from a Linux OS™ to an Android OS™ as the software update. In such scenario, based on the OS update, the second electronic device 402 may build or acquire new voice enabled features such as, text-to-speech and speech-to-text capabilities as the updated capabilities of the second electronic device 402. Further, the second electronic device 402 may further determine the updated capabilities (i.e. updated second capability information) for the second electronic device 402 based on the software update on the second electronic device 402 and may further transmit the updated second capability information to the circuitry 202 of the server 102. For example, the circuitry 202 of the server 102 may further determine that a smart assistant functionality or voice enabled features (i.e. fifth set of configuration values) may be enabled for the second electronic device 402 based on the updated second capability information received from the second electronic device 402. The circuitry 202 may further transmit the determined smart assistant functionality or voice enabled features (i.e. fifth set of configuration values) to the second electronic device 402. The second electronic device 402 may be further configured or setup based on the received fifth set of configuration values of the settings of the second electronic device 402.

Figure 5:
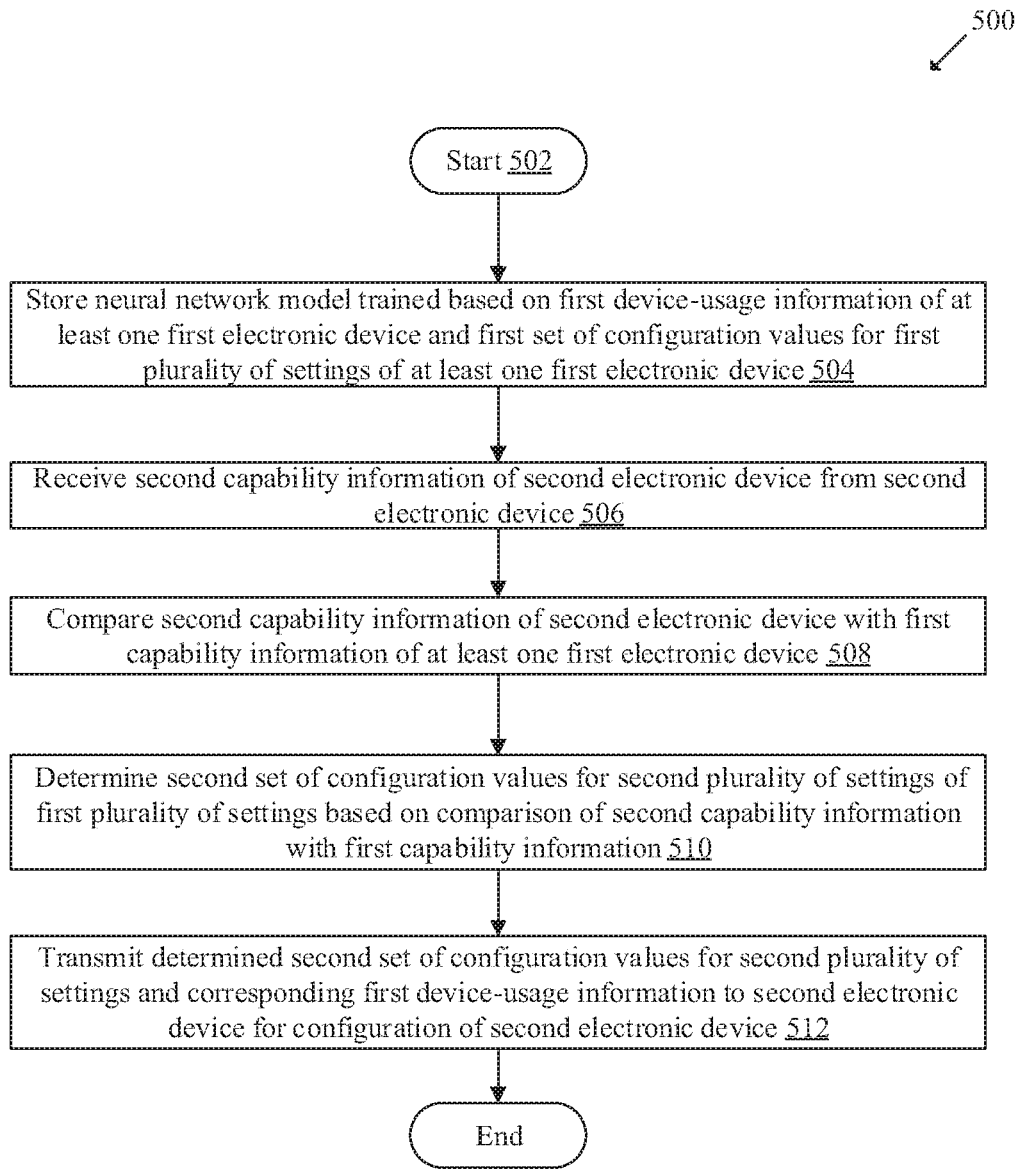
FIG. 5 is a flowchart that illustrates an exemplary method for configuration of settings based on a neural network model, in accordance with an embodiment of the disclosure.

FIG. 5 is a flowchart that illustrates an exemplary method for configuration of settings based on a neural network model, in accordance with an embodiment of the disclosure. FIG. 5 is described in conjunction with elements from FIGS. 1, 2, 3A, 3B, 3C, 4A, and 4B. With reference to FIG. 5, there is shown a flowchart 500. The operations of the flowchart 500 may be executed by a computing system, such as, the server 102 or the circuitry 202 or the processor 204. The operations may start at 502 and proceed to 504.

At 504, the neural network model 104 trained based on the first device-usage information of at least one first electronic device (e.g., the electronic device 106a or one of the first set of electronic devices 106) and the first set of configuration values for the first plurality of settings of the at least one first electronic device may be stored. In one or more embodiments, the circuitry 202 of the server 102 may be configured to train the neural network model 104 and store the trained neural network model 104 in the memory 206 of the server 102. The details related to the training of the neural network model 104 are described, for example, in FIGS. 3A, 3B, and 3C.

At 506, the second capability information of the second electronic device 108 (or the second electronic device 402) may be received from the second electronic device 108. In one or more embodiments, the circuitry 202 may be configured to receive the second capability information of the second electronic device 108 from the second electronic device 108, via the communication network 112. The second capability information may include, but is not limited to, hardware capability information and software capability information, associated with the second electronic device 108 (or the second electronic device 402) as described, for example, in FIG. 4A.

At 508, the second capability information of the second electronic device 108 may be compared with the first capability information of the at least one first electronic device (e.g., the electronic device 106a or one of the first set of electronic devices 106). In one or more embodiments, the circuitry 202 may be configured to compare the second capability information with the first capability information as described, for example, in FIG. 4A.

At 510, the second set of configuration values for the second plurality of settings of the first plurality of settings may be determined based on the comparison of the second capability information with the first capability information. In one or more embodiments, the circuitry 202 may be configured to determine the second set of configuration values for the second plurality of settings of the first plurality of settings based on the comparison of the second capability information with the first capability information. In an embodiment, the second plurality of settings may be same or a sub-set of the first plurality of settings. The determination of the second set of configuration values for the second plurality of settings is described, for example, in FIG. 4A.

At 512, the determined second set of configuration values for the second plurality of settings and the corresponding first device-usage information may be transmitted to the second electronic device 108 for the configuration of the second electronic device 108. In one or more embodiments, the circuitry 202 may be configured to transmit the determined second set of configuration values for the second plurality of settings and the corresponding first device-usage information to the second electronic device 108. The second electronic device 108 may be configured or setup based on the received second set of configuration values for the second plurality of settings and the corresponding first device-usage information. The configuration of the second electronic device 108 based on the second set of configuration values and the corresponding first device usage-information is described, for example, in FIGS. 4A and 4B. The control may pass to end.

Although the flowchart 500 is illustrated as discrete operations, such as 504, 506, 508, 510, and 512, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, instructions executable by a machine and/or a computer, such as, a server. The at least one code section may cause the machine and/or computer to perform operations that include storage of a neural network model trained based on first device-usage information of at least one first electronic device and a first set of configuration values for a first plurality of settings of the at least one first electronic device. The at least one first electronic device may include first capability information corresponding to the first plurality of settings. The operations may further include reception of second capability information of a second electronic device from the second electronic device. The at least one first electronic device and the second electronic device may be associated with a user. The operations may further include comparison of the second capability information of the second electronic device with the first capability information of the at least one first electronic device. Further, the operations may further include determination of a second set of configuration values for a second plurality of settings of the first plurality of settings based on the comparison of the second capability information with the first capability information. The operations may further include transmission of the determined second set of configuration values for the second plurality of settings and the corresponding first device-usage information to the second electronic device for configuration of the second electronic device.

Exemplary aspects of the disclosure may include a server (such as, the server 102 in FIG. 1) configured to store a neural network model (such as, the neural network model 104 in FIG. 1). The server 102 may include circuitry (such as, the circuitry 202 in FIG. 2) and a memory (such as, the memory 206 in FIG. 2). The memory 206 may be configured to store the neural network model 104 trained based on first device-usage information of at least one first electronic device (such as, the electronic device 106a of the first set of electronic devices 106 in FIG. 1) and a first set of configuration values for a first plurality of settings of the electronic device 106a. The electronic device 106a may include first capability information corresponding to the first plurality of settings. The circuitry 202 may be configured to receive second capability information of a second electronic device (such as, the second electronic device 108 in FIG. 1) from the second electronic device 108. The electronic device 106a and the second electronic device 108 may be associated with a user (such as, the user 114 in FIG. 1). The circuitry 202 may be configured to compare the second capability information of the second electronic device 108 with the first capability information of the electronic device 106a. The circuitry 202 may be further configured to determine a second set of configuration values for a second plurality of settings of the first plurality of settings based on the comparison of the second capability information with the first capability information. Further, the circuitry 202 may be configured to transmit the determined second set of configuration values for the second plurality of settings and the corresponding first device-usage information to the second electronic device 108 for configuration of the second electronic device 108.

In one or more embodiments, the first device-usage information may include information related to at least one of, but not limited to, a time of usage, a location of usage, user-profile information of a plurality of users, a network connection status, identification information of a connected electronic device, a genre of content rendered, a mode of operation, or a user-input, associated with the electronic device 106a. Further, the first capability information may include at least one of, but not limited to, hardware capability information or software capability information, associated with the electronic device 106a. In addition, examples of the first plurality of settings may include, but are not limited to, a display setting, a font setting, a color setting, a power setting, an audio setting, a network setting, a user-interface setting, a closed caption setting, an application setting, an accessibility setting, a diagnostic setting, or a security setting, associated with the electronic device 106a.

In one or more embodiments, the circuitry 202 may be configured to receive, from the second electronic device 108, a user-input associated with a setting of the second plurality of settings configured on the second electronic device 108. The circuitry 202 may be further configured to transmit, to the second electronic device 108, a user-interface (UI) element to configure the setting based on the user-input. Further, the circuitry 202 may be configured to re-train the neural network model 104 based on the received user-input associated with the setting of the second electronic device 108.

In one or more embodiments, the circuitry 202 may be configured to receive, from the second electronic device 108, second device-usage information of the second electronic device 108 based on the configured second plurality of settings. Thereafter, the circuitry 202 may re-train the neural network model 104 based on the received second device-usage information of the second electronic device 108.

In one or more embodiments, the circuitry 202 may be configured to receive, from the second electronic device 108, information related to a connection of a third electronic device (such as, the third electronic device 110 in FIG. 1) with the second electronic device 108. The circuitry 202 may then receive, third capability information associated with the third electronic device 110 from the second electronic device 108. Thereafter, the circuitry 202 may compare the third capability information of the third electronic device 110 with the second capability information of the second electronic device 108. The circuitry 202 may be further configured to determine a third set of configuration values for a third plurality of settings of the second plurality of settings based on the comparison of the third capability information with the second capability information. Further, the circuitry 202 may be configured to transmit the determined third set of configuration values for the third plurality of settings and the corresponding first device-usage information to the third electronic device 110 for configuration of the third electronic device 110. In one or more embodiments, the circuitry 202 may be configured to receive, from the third electronic device 110, third device-usage information of the third electronic device 110 based on the configured third plurality of settings. Thereafter, the circuitry 202 may re-train the neural network model 104 based on the received third device-usage information of the third electronic device 110.

In one or more embodiments, the electronic device 106a may include a plurality of user profiles to which the neural network model 104 may be trained. The circuitry 202 may be configured to receive information of a user profile of the plurality of user profiles from the second electronic device 108. The circuitry 202 may be further configured to transmit, to the second electronic device 108, a fourth set of configuration values for a fourth plurality of settings of the first plurality of settings and the corresponding first device-usage information based on application of the neural network model 104 on the received information of the user profile.

In one or more embodiments, the circuitry 202 may be configured to determine one or more services supported by the second electronic device 108 based on the received second capability information of the second electronic device 108. The circuitry 202 may be further configured to transmit, to the second electronic device 108, notification information associated with one or more applications based on the determined one or more services.

In one or more embodiments, the circuitry 202 may be configured to receive, from the second electronic device 108, updated second capability information associated with a software upgrade on the second electronic device 108. Thereafter, the circuitry 202 may compare the updated second capability information of the second electronic device 108 with the first capability information of the first set of electronic devices 106. Further, the circuitry 202 may be configured to determine a fifth set of configuration values for a fifth plurality of settings of the first plurality of settings based on the comparison of the updated second capability information with the first capability information. The circuitry 202 may be further configured to transmit the determined fifth set of configuration values for the fifth plurality of settings and the corresponding first device-usage information to the second electronic device 108 for configuration of the second electronic device 108.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A server, comprising:
    memory configured to store a neural network model; and
    circuitry configured to:
        train the neural network model based on:
            first device-usage information of a first electronic device, wherein the first device-usage information comprises:
                first information related to a plurality of user profiles of the first electronic device, wherein the plurality of user profiles includes a first user profile of a first user of the first electronic device, and a second user profile of a second user of the first electronic device; and
                at least one of:
                    second information associated with identification of an external electronic device connected to the first electronic device, or
                    third information associated with a genre of content rendered by the first electronic device, and
            a first set of configuration values for a first plurality of settings of the first electronic device, wherein the first electronic device includes first capability information corresponding to the first plurality of settings;

receive, from a second electronic device, second capability information of the second electronic device, wherein the second electronic device is associated with at least one of the first user or the second user of the first electronic device;

compare the second capability information of the second electronic device with the first capability information of the first electronic device;

determine a second set of configuration values for a second plurality of settings of the first plurality of settings based on the trained neural network model and the comparison of the second capability information with the first capability information; and transmit the determined second set of configuration values for the second plurality of settings and the first device-usage information to the second electronic device for configuration of the second electronic device.

2. The server according to claim 1, wherein the first device-usage information further comprises information related to at least one of a time of usage, a location of usage, a network connection status, a mode of operation, or a user-input, associated with the first electronic device.

3. The server according to claim 1, wherein the first capability information comprises at least one of hardware capability information or software capability information, associated with the first electronic device.

4. The server according to claim 1, wherein the first plurality of settings comprise at least one of a display setting, a font setting, a color setting, a power setting, an audio setting, a network setting, a user-interface setting, a closed caption setting, an application setting, an accessibility setting, a diagnostic setting, or a security setting, associated with the first electronic device.

5. The server according to claim 1, wherein the circuitry is further configured to:

receive, from the second electronic device, a user-input associated with a setting of the second plurality of settings configured on the second electronic device; and transmit, to the second electronic device, a user-interface (UI) element to configure the setting based on the user-input.

6. The server according to claim 5, wherein the circuitry is further configured to re-train the neural network model based on the received user-input associated with the setting of the second electronic device.

7. The server according to claim 1, wherein the circuitry is further configured to:

receive, from the second electronic device, second device-usage information of the second electronic device based on the configuration of the second electronic device by the second plurality of settings; and re-train the neural network model based on the received second device-usage information of the second electronic device.

8. The server according to claim 1, wherein the circuitry is further configured to:

receive, from the second electronic device, information related to a connection of a third electronic device with the second electronic device;

receive, from the second electronic device, third capability information associated with the third electronic device;

compare the third capability information of the third electronic device with the second capability information of the second electronic device;

determine a third set of configuration values for a third plurality of settings of the second plurality of settings based on the comparison of the third capability information with the second capability information; and transmit the determined third set of configuration values for the third plurality of settings and the first device-usage information to the third electronic device for configuration of the third electronic device.

9. The server according to claim 8, wherein the circuitry is further configured to:

receive, from the third electronic device, third device-usage information of the third electronic device based on the configuration of the third electronic device by the third plurality of settings; and re-train the neural network model based on the received third device-usage information of the third electronic device.

10. The server according to claim 1, wherein the circuitry is further configured to:

receive, from the second electronic device, information of a specific user profile of the plurality of user profiles; and transmit, to the second electronic device, a fourth set of configuration values for a fourth plurality of settings of the first plurality of settings and the first device-usage information based on application of the neural network model on the received information of the specific user profile.

11. The server according to claim 1, wherein the circuitry is further configured to:

determine at least one service supported by the second electronic device, wherein the at least one service is determined based on the received second capability information of the second electronic device; and transmit, to the second electronic device, notification information associated with at least one application based on the determined at least one service.

12. The server according to claim 1, wherein the circuitry is further configured to:

receive, from the second electronic device, updated second capability information associated with a software upgrade on the second electronic device;

compare the updated second capability information of the second electronic device with the first capability information of the first electronic device;

determine a fifth set of configuration values for a fifth plurality of settings of the first plurality of settings based on the comparison of the updated second capability information with the first capability information; and transmit the determined fifth set of configuration values for the fifth plurality of settings and the first device-usage information to the second electronic device for configuration of the second electronic device.

13. A method, comprising:

in a server:

storing a neural network model;

training the neural network model based on:

first device-usage information of a first electronic device, wherein the first device-usage information comprises:

first information related to a plurality of user profiles of the first electronic device, wherein the plurality of user profiles includes a first user profile of a first user of the first electronic device, and a second user profile of a second user of the first electronic device; and at least one of:
- second information associated with identification of an external electronic device connected to the first electronic device, or
- third information associated with a genre of content rendered by the first electronic device, and a first set of configuration values for a first plurality of settings of first electronic device, wherein the first electronic device includes first capability information corresponding to the first plurality of settings;

receiving, from a second electronic device, second capability information of the second electronic device, wherein the second electronic device is associated with at least one of the first user or the second user of the first electronic device;

comparing the second capability information of the second electronic device with the first capability information of the first electronic device;

determining a second set of configuration values for a second plurality of settings of the first plurality of settings based on the trained neural network model and the comparison of the second capability information with the first capability information; and transmitting the determined second set of configuration values for the second plurality of settings and the first device-usage information to the second electronic device for configuration of the second electronic device.

14. The method according to claim 13, wherein the first device-usage information further comprises information related to at least one of a time of usage, a location of usage, a network connection status, a mode of operation, or a user-input, associated with the first electronic device.

15. The method according to claim 13, wherein the first plurality of settings comprise at least one of a display setting, a font setting, a color setting, a power setting, an audio setting, a network setting, a user-interface setting, a closed caption setting, an application setting, an accessibility setting, a diagnostic setting, or a security setting, associated with the first electronic device.

16. The method according to claim 13, further comprising:
receiving, from the second electronic device, a user-input associated with a setting of the second plurality of settings configured on the second electronic device; and
transmitting, to the second electronic device, a user-interface (UI) element to configure the setting based on the user-input.

17. The method according to claim 16, further comprising re-training the neural network model based on the received user-input associated with the setting of the second electronic device.

18. The method according to claim 13, further comprising:
receiving, from the second electronic device, second device-usage information of the second electronic device based on the configuration of the second electronic device by the second plurality of settings; and
re-training the neural network model based on the received second device-usage information of the second electronic device.

19. A non-transitory computer-readable medium having stored thereon, computer-executable instructions that when executed by a server, causes the server to execute operations, the operations comprising:
storing a neural network model;
training the neural network model based on:
first device-usage information of a first electronic device, wherein the first device-usage information comprises:
first information related to a plurality of user profiles of the first electronic device, wherein the plurality of user profiles includes a first user profile of a first user of the first electronic device, and a second user profile of a second user of the first electronic device; and
at least one of:
second information associated with identification of an external electronic device connected to the first electronic device, or
third information associated with a genre of content rendered by the first electronic device, and
a first set of configuration values for a first plurality of settings of the first electronic device, wherein the first electronic device includes first capability information corresponding to the first plurality of settings;
receiving, from a second electronic device, second capability information of the second electronic device, wherein the second electronic device is associated with at least one of the first user or the second user of the first electronic device;
comparing the second capability information of the second electronic device with the first capability information of the first electronic device;
determining a second set of configuration values for a second plurality of settings of the first plurality of settings based on the trained neural network model and the comparison of the second capability information with the first capability information; and
transmitting the determined second set of configuration values for the second plurality of settings and the first device-usage information to the second electronic device for configuration of the second electronic device.

20. The non-transitory computer-readable medium according to claim 19, wherein the first device-usage information comprises information related to at least one of a time of usage, a location of usage, a network connection status, a mode of operation, or a user-input, associated with the first electronic device.

* * * * *